(12) United States Patent
Kakaraparthy et al.

(10) Patent No.: US 10,586,478 B2
(45) Date of Patent: *Mar. 10, 2020

(54) DYNAMICALLY REFORMING SURFACES TO DELIVER PHYSICALITY IN INTRODUCTORY CHILD EDUCATION

(71) Applicant: International Business Machines Corporation, Armonk, NY (US)

(72) Inventors: Sreekanth L. Kakaraparthy, Bangalore (IN); Vijay A. Kumar, Bangalore (IN); Kuntal Dey, New Delhi (IN); Danish Contractor, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,655

(22) Filed: Jun. 14, 2019

(65) Prior Publication Data

US 2019/0295448 A1    Sep. 26, 2019

Related U.S. Application Data

(63) Continuation of application No. 15/908,864, filed on Mar. 1, 2018, now Pat. No. 10,395,571.

(51) Int. Cl.
*G09G 3/00* (2006.01)
*G06F 16/583* (2019.01)
*G09B 5/02* (2006.01)

(52) U.S. Cl.
CPC ......... *G09G 3/001* (2013.01); *G06F 16/5854* (2019.01); *G09B 5/02* (2013.01); *G09G 3/003* (2013.01); *G09G 2354/00* (2013.01)

(58) Field of Classification Search
CPC ...... G06F 3/016; G09B 21/003; G09B 21/004
See application file for complete search history.

(56) References Cited

U.S. PATENT DOCUMENTS

| | | | |
|---|---|---|---|
| 774,998 A | | 11/1904 | Willson |
| 5,717,423 A | * | 2/1998 | Parker ..................... G06F 3/016 345/108 |

(Continued)

FOREIGN PATENT DOCUMENTS

WO    2016088090 A1    6/2016

OTHER PUBLICATIONS

Iwata et al.; "Project FEELEX: Adding Haptic Surface to Graphics"; ACM SIGGRAPH 2001—Los Angeles, CA, USA; 7 pages.

(Continued)

*Primary Examiner* — Koosha Sharifi-Tafreshi
(74) *Attorney, Agent, or Firm* — Cantor Colburn LLP; Richard Wilhelm

(57) ABSTRACT

A method for dynamically reforming a moveable display surface to deliver physicality to a user is provided. The method generates a physical profile of the user to calibrate the moveable display surface by receiving a measurement of at a hand of the user and estimating a maximum depth of a palm of the hand when folded based on causing a subset of cells of the plurality of moveable cells of the grid to increase in height. At least one image of a plurality of images, objects of the at least one image, and relative positions of objects of the at least one image are received Physicality is delivered to the user by causing the grid of the moveable display surface to render the objects based at least in part on the physical profile and the relative positions.

20 Claims, 12 Drawing Sheets

(56) References Cited

U.S. PATENT DOCUMENTS

| | | | |
|---|---|---|---|
| 6,535,201 B1* | 3/2003 | Cooper | G06F 3/016 340/407.1 |
| 7,245,292 B1* | 7/2007 | Custy | G06F 3/011 178/18.01 |
| 7,743,348 B2 | 6/2010 | Robbins et al. | |
| 8,203,529 B2 | 6/2012 | Rogowitz et al. | |
| 8,279,200 B2 | 10/2012 | Kikin-Gil | |
| 8,954,848 B2* | 2/2015 | Scheufler | B60K 35/00 715/702 |
| 9,600,070 B2 | 3/2017 | Chatterjee et al. | |
| 2005/0030292 A1* | 2/2005 | Diederiks | G09B 21/003 345/173 |
| 2009/0231287 A1 | 9/2009 | Rogowitz et al. | |
| 2009/0250267 A1 | 10/2009 | Heubel et al. | |
| 2010/0295820 A1 | 11/2010 | Kikin-Gil | |
| 2017/0206807 A1* | 7/2017 | Hong | G09B 21/004 |

OTHER PUBLICATIONS

Kakaraparthy et al., "Dynamically Reforming Surfaces to Deliver Physicality in Introductory Child Education"; U.S. Appl. No. 15/908,864, filed Mar. 1, 2018.

List of IBM Patents or Patent Applications Treated as Related; Date Filed: Jun. 14, 2019, 2 pages.

Mell et al.; "The NIST Definition of Cloud Computing—Recommendations of the National Institute of Standards and Technology"; US Department of Commerce, Computer Security Division; Sep. 2011; 7 pages.

\* cited by examiner

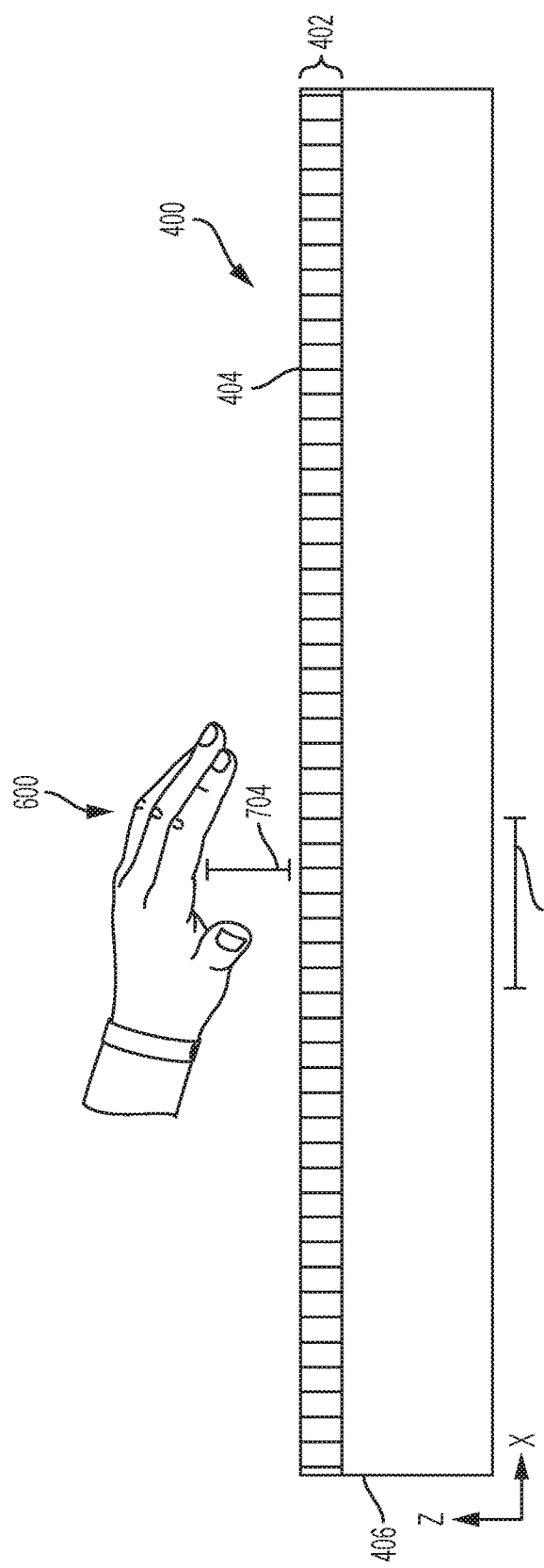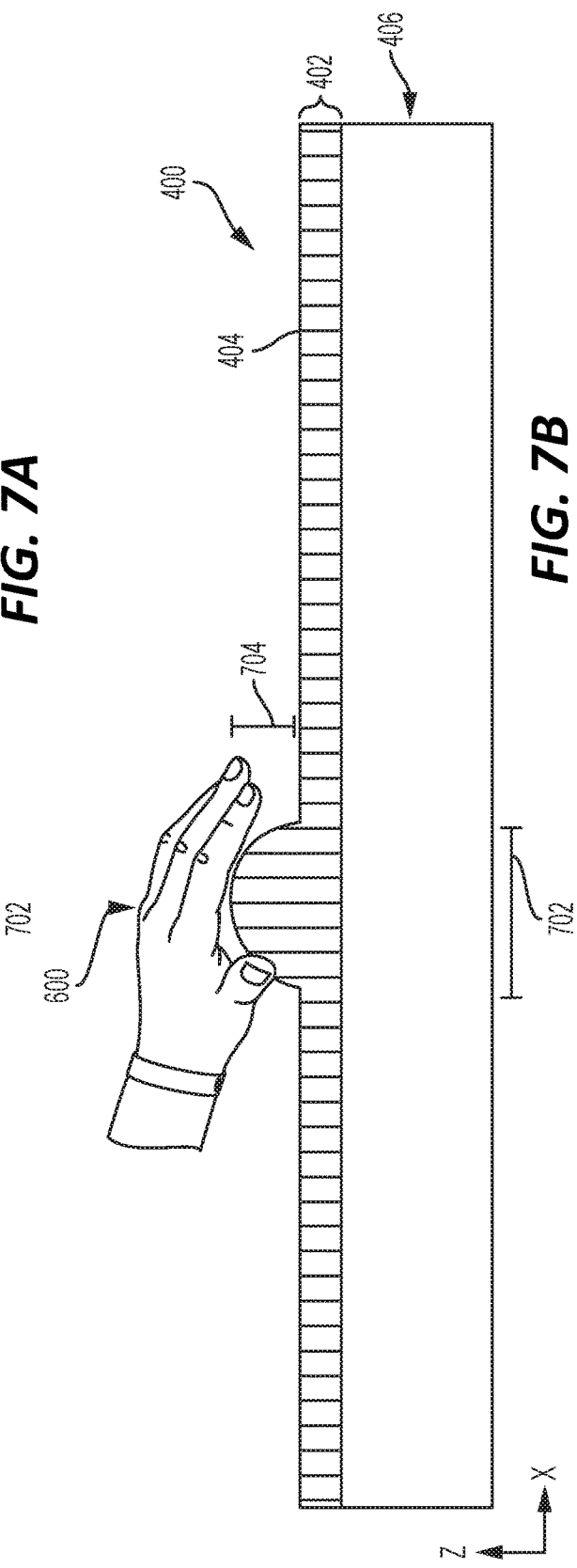

DYNAMICALLY REFORMING SURFACES TO DELIVER PHYSICALITY IN INTRODUCTORY CHILD EDUCATION

DOMESTIC PRIORITY

This application is a continuation of U.S. application Ser. No. 15/908,864, titled "DYNAMICALLY REFORMING SURFACES TO DELIVER PHYSICALITY IN INTRODUCTORY CHILD EDUCATION" filed Mar. 1, 2018, the contents of which are incorporated by reference herein in its entirety.

BACKGROUND

The present invention generally relates to changeable topography devices, and more specifically, to systems, computer-implemented methods, and computer program products that dynamically reform surfaces to deliver physicality to a user, which may be used for various purposes including delivery of physicality in introductory child education.

Traditionally, educational material is delivered through physical or digital environments, such as for example textbooks in a physical environment, or digital books, audio, video, and interactive text/audio/video in a digital environment. Some systems provide educational material on a digital device and on a fixed surface, such as for example, digital mobile phones, spherical balls, speaking robots, websites, and others.

SUMMARY

Embodiments of the present invention provide a computer-implemented method for dynamically reforming a moveable display surface to deliver physicality to a user. A non-limiting example of the computer-implemented method includes generating a physical profile of the user to calibrate the moveable display surface, in which the generating of the physical profile includes receiving at least one measurement of at least one hand of the user and estimating a maximum depth of a palm of the at least one hand when folded, in which estimating the maximum depth of the palm when folded includes transmitting a control signal to the moveable display surface that causes a subset of cells of the plurality of moveable cells of the grid to increase in height until each cell of the subset of cells touches the folded palm of the user. The method includes receiving at least one image of a plurality of images, objects of the at least one image, and relative positions of objects of the at least one image. The method includes delivering physicality to the user by transmitting a control signal to the moveable display surface that causes the grid of the moveable display surface to render the objects of the at least one image based at least in part on the physical profile and the relative positions of the objects of the at least one image.

Embodiments of the present invention provide a system for dynamically reforming a moveable display surface to deliver physicality to a user. The system includes one or more processors configured to perform a method. A non-limiting example of the method includes generating a physical profile of the user to calibrate the moveable display surface, in which the generating of the physical profile includes receiving at least one measurement of at least one hand of the user and estimating a maximum depth of a palm of the at least one hand when folded, in which estimating the maximum depth of the palm when folded includes transmitting a control signal to the moveable display surface that causes a subset of cells of the plurality of moveable cells of the grid to increase in height until each cell of the subset of cells touches the folded palm of the user. The method includes receiving at least one image of a plurality of images, objects of the at least one image, and relative positions of objects of the at least one image. The method includes delivering physicality to the user by transmitting a control signal to the moveable display surface that causes the grid of the moveable display surface to render the objects of the at least one image based at least in part on the physical profile and the relative positions of the objects of the at least one image.

Embodiments of the invention provide a computer program product for dynamically reforming a moveable display surface to deliver physicality to a user, the computer program product comprising a computer readable storage medium having program instructions embodied therewith. The program instructions are executable by a system comprising one or more processors to cause the system to perform a method. A non-limiting example of the method includes generating a physical profile of the user to calibrate the moveable display surface, in which the generating of the physical profile includes receiving at least one measurement of at least one hand of the user and estimating a maximum depth of a palm of the at least one hand when folded, in which estimating the maximum depth of the palm when folded includes transmitting a control signal to the moveable display surface that causes a subset of cells of the plurality of moveable cells of the grid to increase in height until each cell of the subset of cells touches the folded palm of the user. The method includes receiving at least one image of a plurality of images, objects of the at least one image, and relative positions of objects of the at least one image. The method includes delivering physicality to the user by transmitting a control signal to the moveable display surface that causes the grid of the moveable display surface to render the objects of the at least one image based at least in part on the physical profile and the relative positions of the objects of the at least one image.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7A depicts a side view of a moveable display surface at a first point in time, in which a user's hand is placed on the moveable display surface 400 in a folded manner in accordance with one or more embodiments of the present invention;

FIG. 7B depicts a side view of the moveable display surface of FIG. 7A at second point in time, in which cells of the moveable display surface are raised until the cells touch the palm of the user's hand in accordance with one or more embodiments of the present invention;

Figure 1:
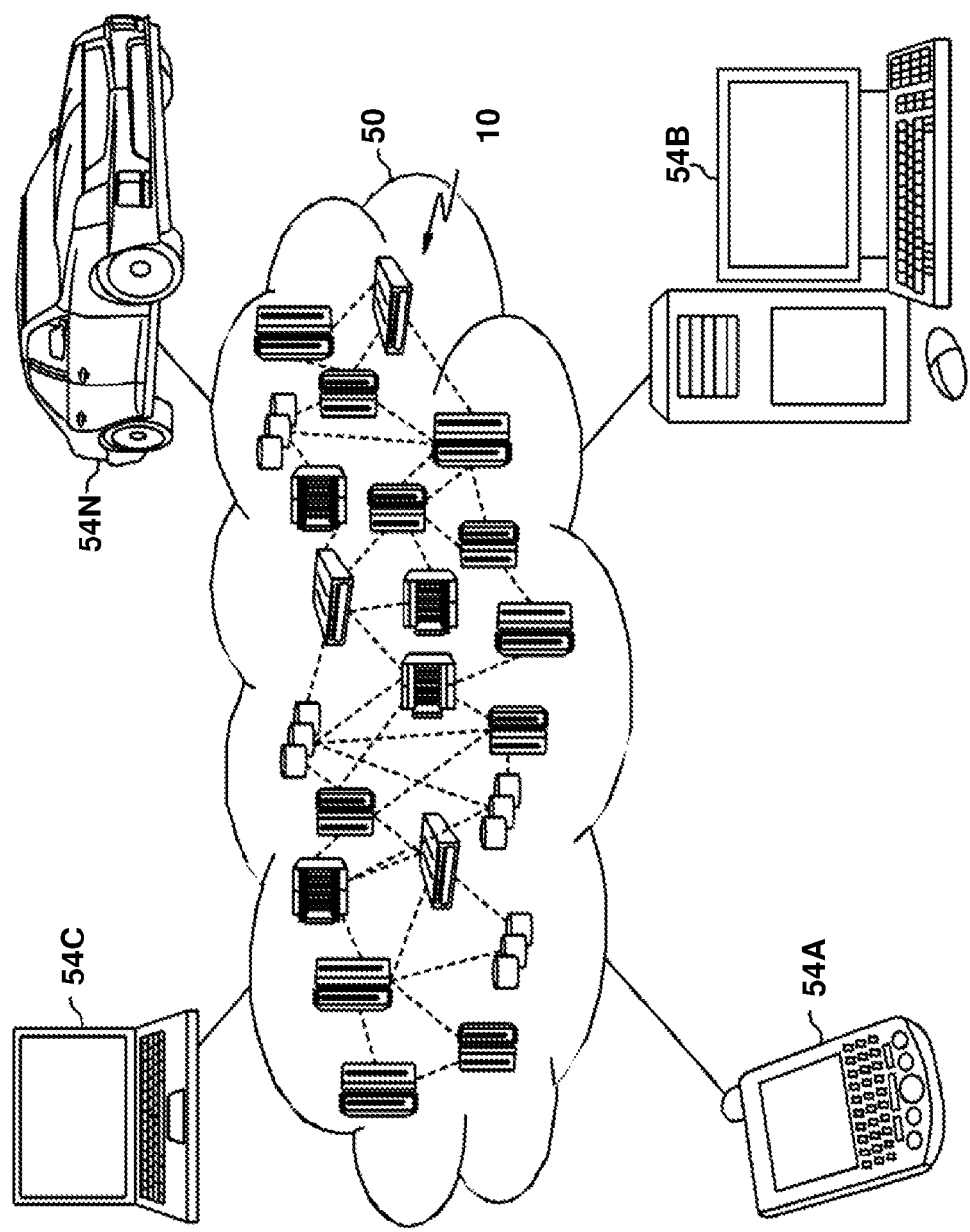
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
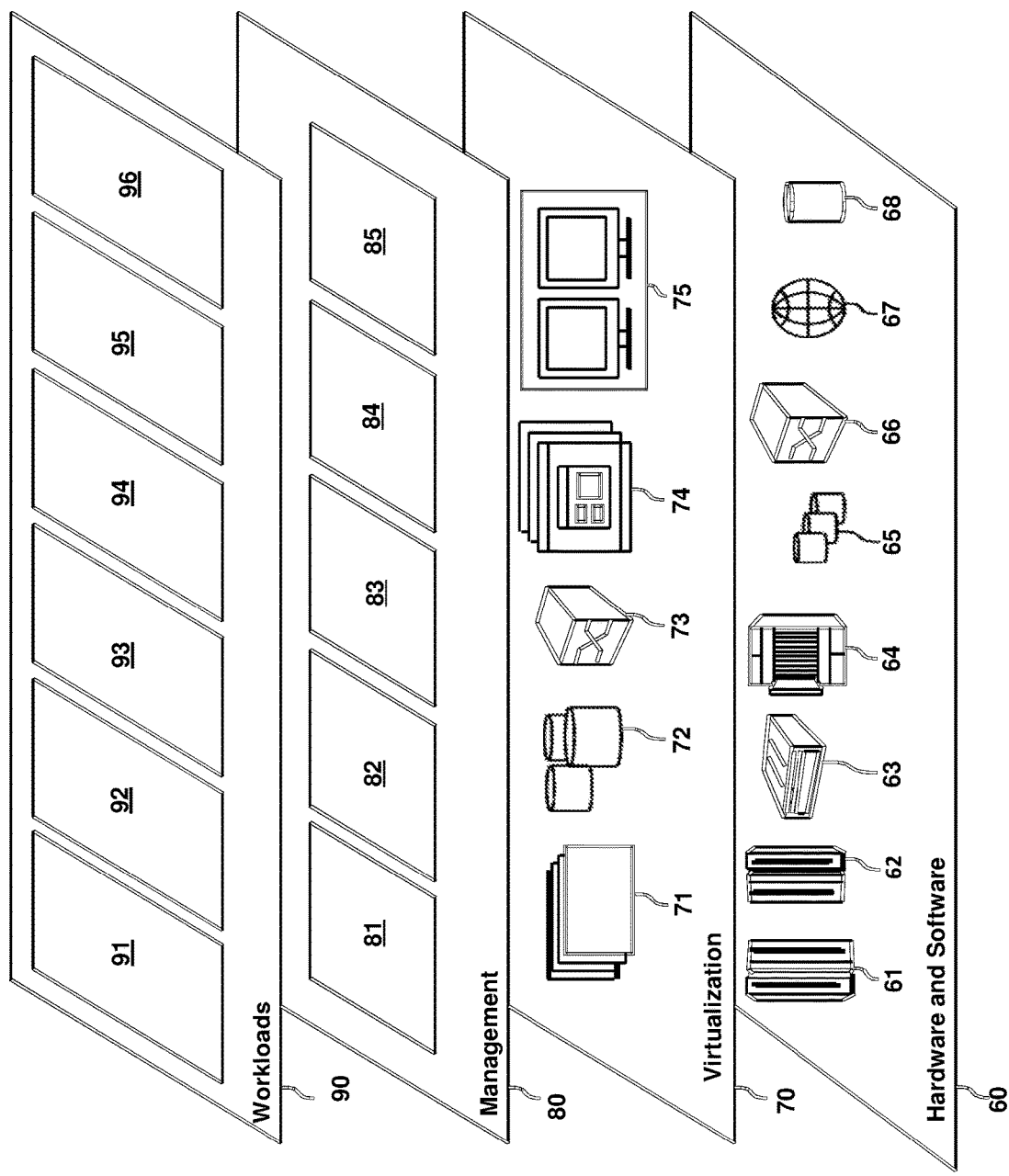
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and moveable display surface control processing 96.

Turning now to an overview of technologies that are more specifically relevant to aspects of the invention, traditionally, educational material has been delivered through physical or digital environments, such as for example textbooks in a physical environment, or digital books, audio, video, and interactive text/audio/video in a digital environment. Some systems provide educational material on a digital device and/or surface, such as for example, digital mobile phones, spherical balls, speaking robots, websites, and others.

Some technologies utilize a pre-build fixed-top surface or dynamically changeable surface to provide physicality to users, however, several technical problems arise in prior systems. For example, one problem found in prior systems is that the logic that is used to drive topographical change in a surface does not take into consideration a combination of certain physical characteristics of the user and certain characteristics of objects that are to be displayed. Moreover, no single system or method exists that adapts dynamic surface changing technology for the delivery of education material on surfaces, nor are there systems that allow for the alternation of a shape and/or texture based upon associated education material and a particular learner's physical characteristics. As used herein the phrase "learner" can refer to, but is not limited to, a person who is a student and/or someone who is under the age of eighteen. For example, a learner may be any person who is being presented with information via a surface for purposes that include educational purposes.

Turning now to an overview of the aspects of the invention, one or more embodiments of the invention address the above-described shortcomings of the prior art by providing techniques for delivering digital content, such as education material, by changing a topography (and sometimes color) of a moveable display surface (e.g., via surface segment readjustment) in a manner this is based on particular characteristics of objects found in the digital content and based on a user-profile driven selection of an area on a surface within which a texture will change based on measurements of a hand of the user. For example, in some embodiments of the present invention, educational material is delivered to a learner via a moveable display surface in a manner that allows for dynamic alteration of the surface shape, texture, and/or color at a right time based upon associated education material and a learner's physical profile. This allows the system to enable accessible education via particular levels of granularity for presenting shape/textures on the surface to different users as well as allows for augmentation of the physical surface with other physicality aspects for learning, such as for introductory early child education.

In some embodiments of the present invention, the digital content includes educational material that is to be delivered to a user based on particular characteristics of educational objects found in images and based on a user's physical profile, in which the physical profile allows for calibration of the surface in a manner that is unique to characteristics of the user, such as a maximum depth of a hand of the user and/or other suitable hand measurements.

In some embodiments of the present invention, a control circuit is provided that automatically renders education objects on a moveable display surface in accordance with a learner's physical profile by changing surface topography (and sometimes color) to deliver physicality when presenting educational material. For example, the moveable display surface may be caused to present an apple shape with an apple-red color and shade, in which the size and depth being as much as the palm of the child, who is learning, can hold. As used herein a "user" refers to any person, and a "learner" generally refers to, but is not limited to, a person who is a student and/or someone who is under the age of eighteen. For example, a learner may be any person who is to be presented with information via a surface for purposes that include educational purposes.

Figure 3:
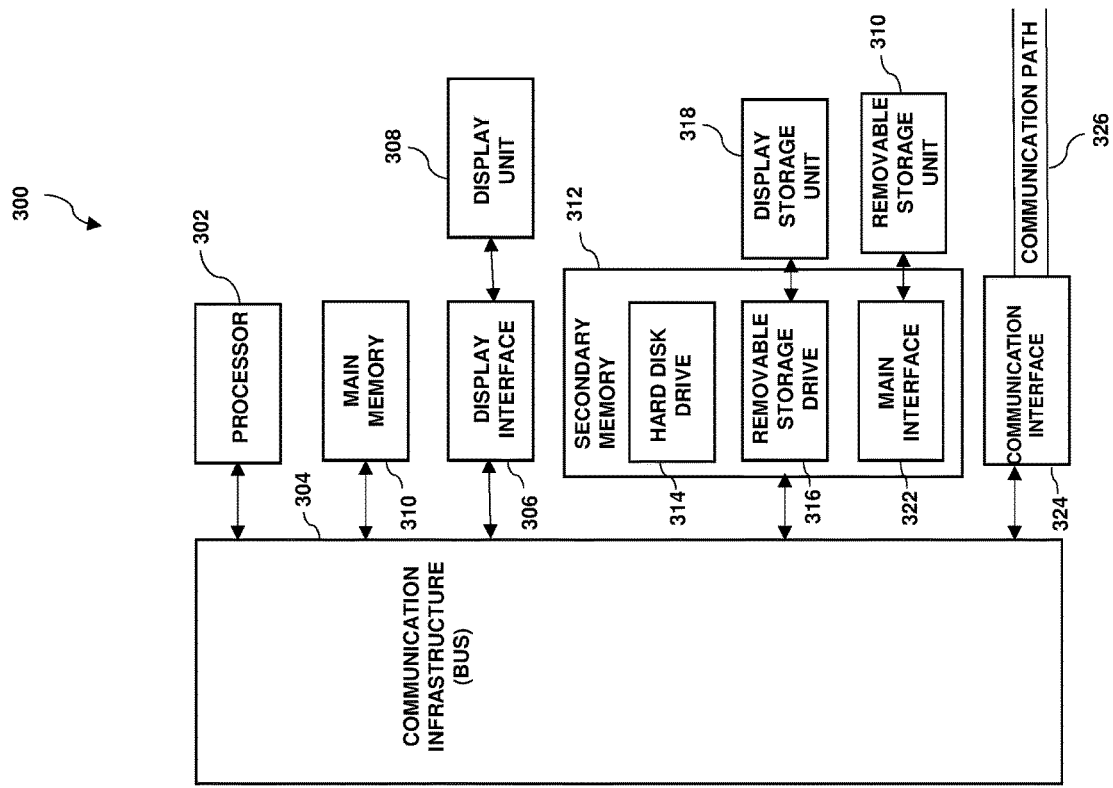
FIG. 3 depicts an exemplary computer system capable of implementing one or more embodiments of the present invention.

Turning now to a more detailed description of aspects of the present invention, FIG. 3 illustrates a high level block diagram showing an example of a computer-based system 300 useful for implementing one or more embodiments of the invention.

Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4A:
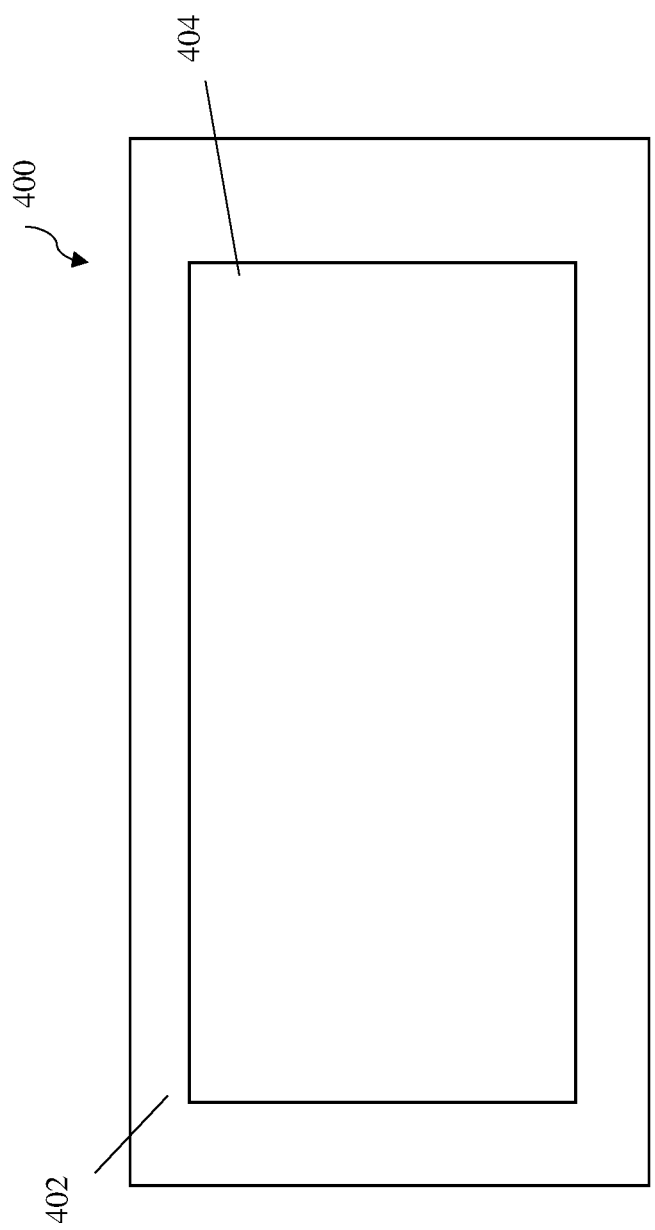
FIG. 4A depicts a top down view of an example moveable display surface that allows for the changing of a topography in accordance with one or more embodiments of the present invention.
Figure 4B:
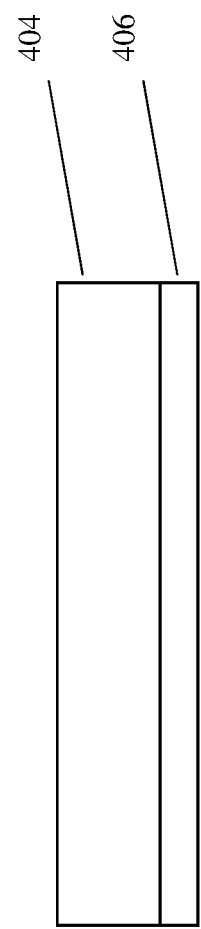
FIG. 4B depicts a side view of the example moveable display surface of FIG. 4A in accordance with one or more embodiments of the present invention.

FIGS. 4A and 4B illustrate an example moveable display surface 400 that allows for the changing of a topography in accordance with one or more embodiments of the present disclosure. FIG. 4A is a top down view of moveable display surface 400, and FIG. 4B is a side view of an individual cell of moveable display surface 400. As illustrated in FIGS. 4A-4B, in some embodiments of the present invention, moveable display surface 400 includes a grid 402 having a plurality of moveable grid cells 404, in which the plurality of moveable grid cells 404 are each able to independently move to change a topography of the moveable display surface 400. In some embodiments of the present invention, the moveable display surface 400 is a subcomponent of an electronic device, such as a computer, tablet, or cellphone for example. A user may interact with the electronic device via one or more input interfaces, for example via the moveable display surface 400. The moveable display surface 400 and/or an electronic device that includes the moveable display surface 400 may further include various components and interfaces, such as, for example a microphone and/or camera.

In some embodiments of the present invention, a change in topography and or shape of the grid 402 of the moveable display surface 400 is performed by changing one or more characteristics of one or more cells of the plurality of moveable grid cells 404. In some embodiments of the present invention, the changes characteristics include one or more of a change in height, width, length, orientation, configuration, layout, texture, pattern, three-dimensional form, or the like for one or more cells of the plurality of grid cell 404 of the grid 402 of the moveable display surface 400. For example, in some embodiments of the present invention, a topographical change of the moveable display surface 400 is implemented by physically altering a height/depth of individual cells of the plurality of moveable grid cells 404, and/or by physically altering a subset of cells of the plurality moveable grid cells 404.

In some embodiments of the present invention, each moveable grid cell of grid 402 includes a mechanical device, such as an actuator, that is configured to change between physical states, thus allowing for the plurality of moveable grid cells 404 to change in response to received control signal. In some embodiments of the present invention, the actuators of the plurality of grid cells 404 include a moving member that can move a grid cell from an initial position to a raised or lowered position or that can deform, rather than move, the surface in order to create a shape/texture change. For example, in some embodiments of the present invention, individual grid cells or a subset of grid cells of the plurality of moveable grid cells 404 may be altered by actuators to create a distinct pixel shape change to display one or more objects to a user.

In some embodiments of the present invention, the moveable display surface 400 and/or control circuit 406 are further include illumination device(s), such as a backlight LED, that are operatively coupled to grid 402, in which the illumination devices are configured to emanate light within a spectrum, for example, an RGB spectrum. In some embodiments of the present invention, moveable display surface 400 and/or control circuit 406 are configured to send light-up signals to the illumination device(s) such that each cell, subset of cells, or plurality of moveable grid cells 404 of grid 402 are caused to display a particular color or sets of colors.

In some embodiments of the present invention, the moveable display surface 400 and/or control circuit 406 include touch sensor(s) that are operatively coupled to the grid 402. For example, in some embodiments of the present invention, each cell of the plurality of moveable cells 404 of grid 404 is equipped with a touch sensor. In some embodiments of the present invention, the touch sensor(s) are used to obtain one or more hand measurements of a user. For example, as will be discussed in further detail below, in some embodiments of the present invention, the touch sensor(s) are used for palm depth calibration when generating a physical profile for a user.

In some embodiments of the present invention, the moveable display surface includes 400 a microphone, in which the moveable display surface 400 and/or control circuit 406 is configured to perform object indention from listened words to identify objects to be presented on the moveable display surface 400.

Although several of the embodiments described herein reference a moveable surface that has a grid comprising a plurality of moveable cells positioned in rows and columns, it should be understood that the present disclosure is not limited to a plurality of moveable cells being in a grid or orthogonal arrays, but can be generally applicable to moveable cells arranged in any number of dimensions and/or orientations. For example, in some embodiments of the present invention, the plurality of grid cells 404 are arranged in a diagonal, concentric circle, three-dimensional, random, or other suitable orientations.

In some embodiments of the present invention, the moveable display surface 400 includes or is operatively coupled to a control circuit 406, in which the control circuit 406 is capable of sending signals to the plurality of moveable cells 404 to move the plurality of moveable cells 404. In some embodiments of the present invention, the control circuit 406 is operatively coupled to the moveable display surface 400 or to one or more components of the moveable display surface 500 via a direct or indirect connection between the control circuit 406 and one or more components of the moveable display surface 400 and/or a direct or indirect connection between the control circuit 406 and the moveable display surface 400 itself. For example, as shown in FIG. 4b, in some embodiments of the present invention, the control circuit 406 is operatively coupled to the moveable display surface 400 by being attached to the plurality of moveable cells 404. Thus in some embodiments of the present invention, the control circuit 406 is a component of the moveable display surface 400, and in some embodiments of the present invention, the control circuit 406 is a component that is separate from the moveable display surface 400. The control circuit 406 may communicate with the moveable display surface 400 and/or components of the moveable display surface 400 via one or more suitable interfaces or connections, such as for example, a physical connection or a network connection.

Figure 5:
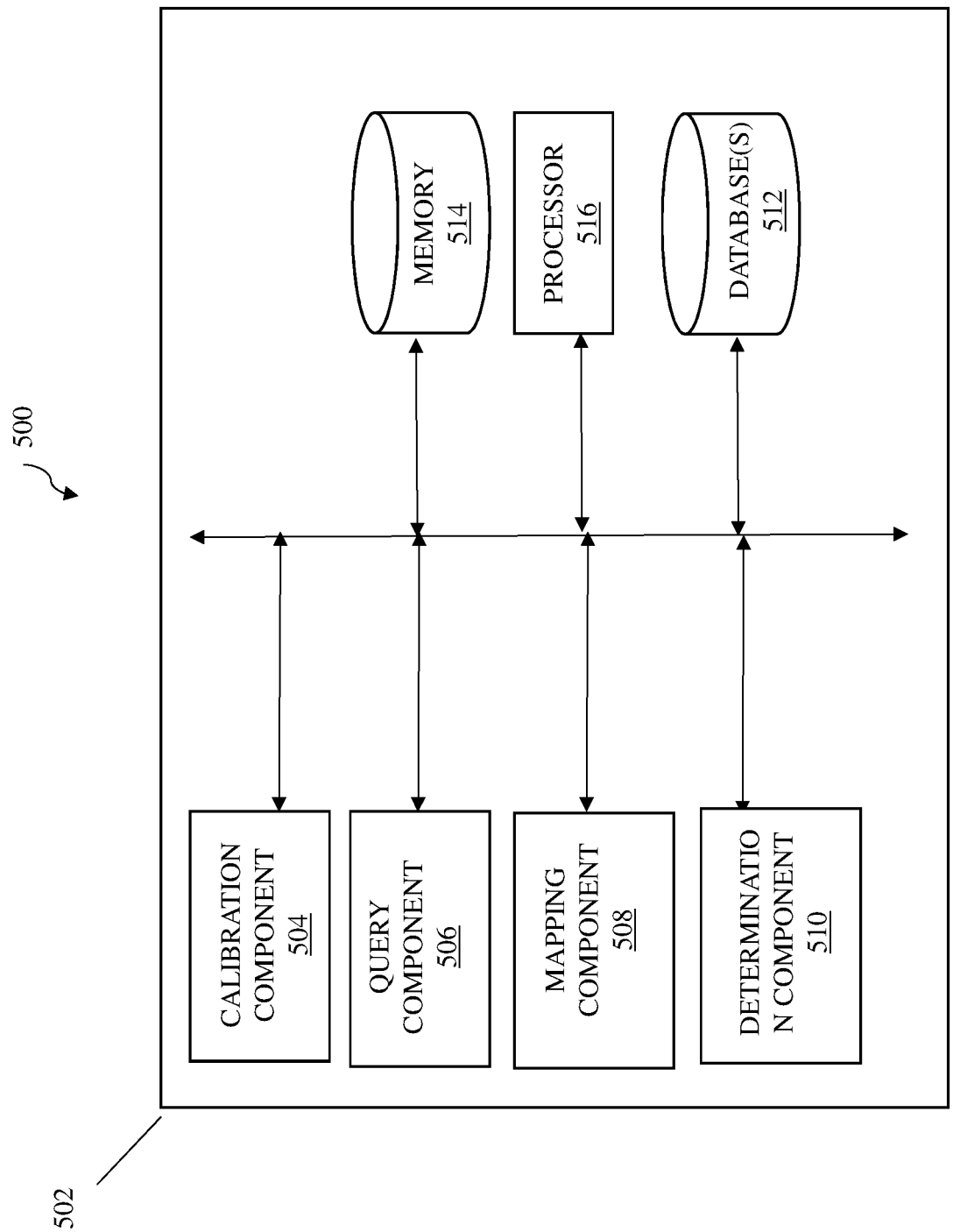
FIG. 5 depicts an example system computer system 500 that is capable of causing a topography of a moveable display surface to change in accordance with one or more embodiments of the present invention.

FIG. 5 depicts an example computer system 500 that is capable of implementing one or more embodiments of the present invention. System 500 is a system that can be utilized to solve a variety of technical issues in connection with technologies such as, but not limited to, education content display technologies, machine learning technologies, data encryption, data analytics technologies, data classification technologies, data clustering technologies, recommendation system technologies, signal processing technologies, and/or other digital technologies. System 500 employs hardware and/or software to solve problems that are highly technical in nature, that are not abstract and that cannot be performed as a set of mental acts by a human.

In the example shown in FIG. 5, system 500 includes a surface control component 502 that includes a calibration component 504, a query component 506, a mapping component 508, a determination component 510, and one or more databases(s) 512. In some embodiments of the present invention, surface control component 502 constitutes machine-executable component(s) embodied within machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the present invention, the surface control component 502 includes a memory 514 that stores computer executable components and instructions. Furthermore, in some embodiments of the invention, the surface control component 502 includes a processor 516 to facilitate execution of the instructions (e.g., computer executable components and corresponding instructions) by the surface control component 502. As shown, the calibration component 504, the query component 506, the mapping component 508, the determination component 510, the databases(s) 512, the memory 514 and/or the processor 516 are electrically and/or communicatively coupled to one another in one or more embodiments of the invention.

In some embodiments of the present invention, the surface control component 502 includes a control circuit (e.g., control circuit 406) and/or a moveable display surface (e.g., moveable display surface 400). In some embodiments of the present invention, the surface control component 502 is in communication with moveable display surface 400 and/or in communication with control circuit 406. As noted above, in some embodiments of the present invention, the moveable display surface 400 includes the control circuit 406.

In general, surface control component 502 is configured to dynamically reform a moveable display surface (e.g., moveable display surface 400) to deliver physicality to a user, such as a learner, based on a physical profile that is generated for the user to calibrate the moveable display surface.

In some embodiments of the present invention, surface control component 502 is configured to generate a physical profile of the user to calibrate the moveable display surface based on one or more hand measurements that are obtained (e.g., via calibration component 504). As will be discussed in further detail below, surface control component 502 utilizes the one or more hand measurement to determine how best to dimension an object that is be presented on a moveable display surface via a plurality of moveable cells such that the object when physical rendered is able to be felt by the user under one hand, under two hands, or between two hands. For example, in the context of a child who is interacting with a moveable display surface, in some embodiments of the present invention, surface control component 502, applies the generated physical profile and a policy heuristic to determine the best size to render a particular object. In some embodiments of the present invention, this involves setting the size of a particular object to be equal to that of a known palm size of the child and setting a depth of the object to be as deep as what the child is capable of holding within her palm. This allows the child to feel the intricate details of the object, which can assist in early education and other forms of education or entrainment purposes. For example, a child may interact with a moveable display surface that is located on a wall of a museum and thus is presented with particular objects have dimensions that are sized based on the unique physical characteristics of the child's hand(s). For example, if the surface control component 502 is to present grapes to a child, the size of the grapes may be set to be equal to that of the known palm size of the child as found during the physical calibration for that child. Moreover, in another example, if what is to be presented to the child is scenery that includes grapes as well as other items, surface control component 502 may be configured to present the grapes such the grapes fit within child's palm such as much as a child can grasp with one hand or as much as the child can reach by simultaneously spreading her two hands on two sides whereas the totality of the scenery is larger than the child's palm, which may be computed by a mapping function that is a function of the child's physical profile.

Figure 6:
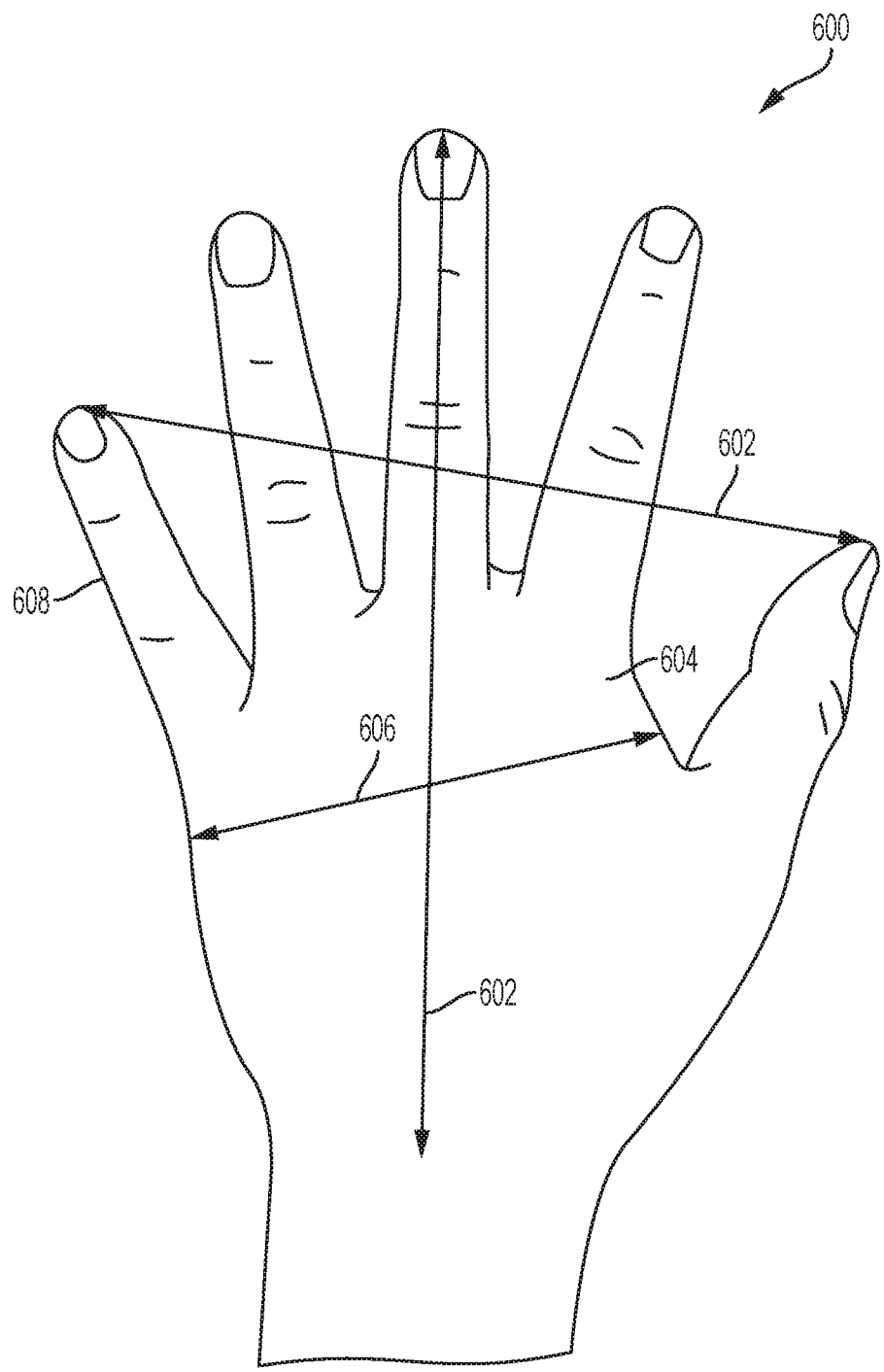
FIG. 6 depicts an example image of hand and associated measurements of a hand of a user in accordance with one or more embodiments of the present invention.

The one or more hand measurements utilized by surface control component 502 to generate a physical profile of the user can be a variety of single hand or multi-hand measurement. FIG. 6 illustrates an example hand 600 and example measurements 602, 604, 606, and 608 of hand 600. Measurements 602 are examples of a measured size of a hand 600. In some embodiments of the present invention, the measured hand size is based on a distance between two points of the user's hand. Measurement 604 is an example of a measured shape of the palm of a hand 600. In some embodiments of the present invention, the shape of the palm is measured and/or identified based on a surface area of the palm and/or circumference of the palm. Measurement 606 is an example of a measured size of a palm of a hand 600. In some embodiments of the present invention, the measured palm size is based on a distance between two points of the user's palm. It should be understood that other suitable measurements of the user's hand may be utilized in one or more embodiments of the present disclosure. For example, in some embodiments of the present invention, the one or more measurements include measuring a shape and size of a full stretched palm and/or hand or a shape and size of a rested palm and/or hand. In some embodiments of the present invention, surface control component 502 is configured to select which measurement to use based on a predetermined policy that establishes which measurement types should be used for certain users. In embodiments of the present invention, the size of the palm and/or hand 600 is utilized by surface control component 502 to scale the dimensions of a particular object (e.g., shape of a particular object) when the object is presented to the user (e.g., size 1004 of object 902 shown in FIG. 10A).

In some embodiments of the present invention, the generating of the physical profile includes receiving at least one measurement of at least one hand of the user and estimating a maximum depth of a palm of at least one hand when folded. In some embodiments of the present invention, the maximum depth of the palm when folded is estimated by transmitting a control signal to the movable display surface 400, in which the control signal causes a subset of cells of the plurality of moveable cells 404 to increase in height until each cell of the subset of cells touches the folded palm of the user. FIGS. 7A-7B illustrate one such example, in which FIG. 7A illustrates a side view of moveable display surface 400 at a first point in time, in which a user's hand 600 is placed on the moveable display surface 400 in a folded manner (e.g., cupping of the hand) over a subset of cells 702 of the plurality of moveable cells 404, in which a depth 704 of the user's palm is measured. FIG. 7B illustrates a side view of moveable display surface 400 at a second point in time, in which the subset of cells 702 are raised until each of the subsets of cells 702 touch the palm of the user's hand 600. A maximum of the depth 704 of the user's hand is estimated based on the maximum distance traversed by one or more cells of the subset of cells 702. In some embodiments of the present invention, the surface control component 502 is configured to identify which cells of the plurality of cells 404 are to be selected as the subset of cells 702. In some embodiments of the present invention, the surface control component 502 identifies the subset of cells 702 based on the positions of one or more fingers of the hand 600 on the moveable surface 400 when the one or more fingers are touching the moveable display surface 400 (e.g., as detected by touch sensors). In some embodiments of the present invention, the subset of cells 702 comprises an area between positions of the one or more fingers of the hand 600.

Figure 8A:
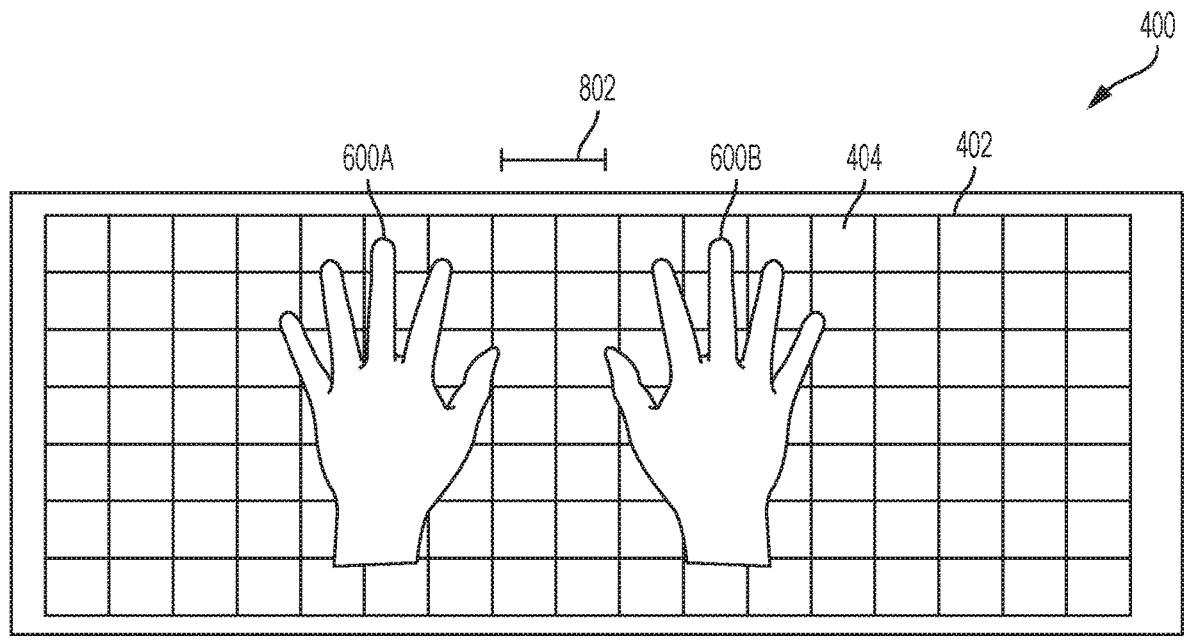
FIG. 8A depicts a top view of a moveable display surface at a first point in time, in in which the user's hands and are placed on a moveable display surface at a first user selected position and a first measurement is measured between the two hands and in accordance with one or more embodiments of the present invention.
Figure 8B:
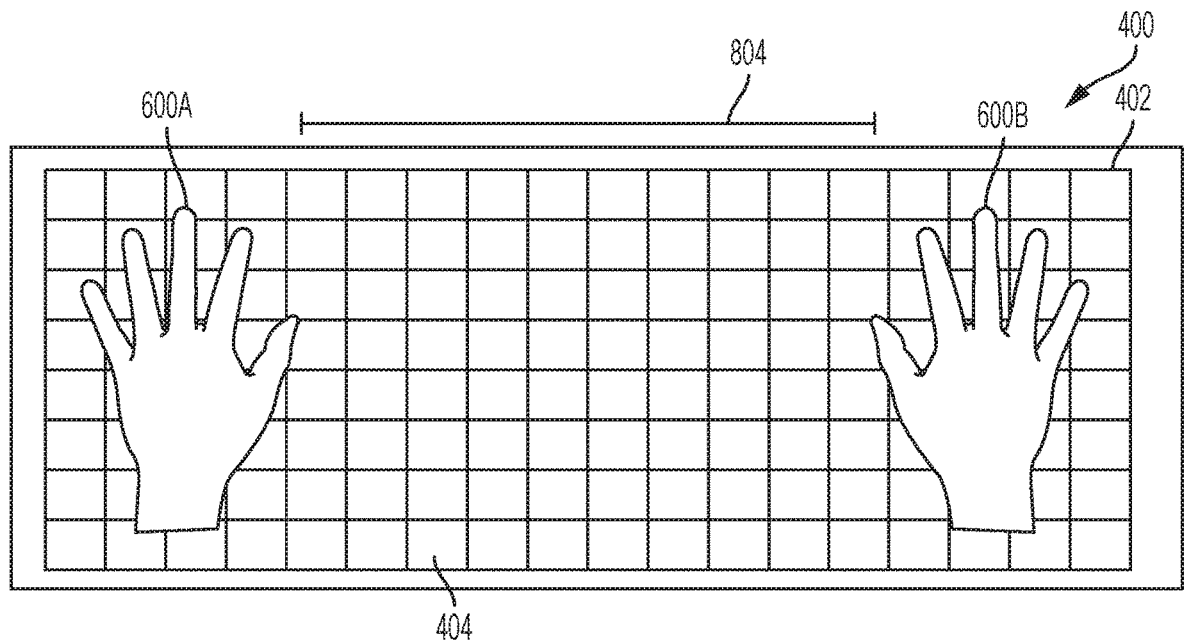
FIG. 8B depicts a side view of the moveable display surface of FIG. 8A at second point in time, in which the user's s hands are placed on the moveable display surface at a second user selected position and a second measurement is measured between the two hands in accordance with one or more embodiments of the present invention.

In some embodiments of the present invention, the at least one measurement of the at least one hand of the user includes a first and second measurement that is taken between two palms of the user. FIGS. 8A-8B illustrate one such example, in which FIG. 8A illustrates a top view of a moveable display surface 400 at a first point in time, in which the users hands 600a and 600b are placed on the moveable display surface 400 at a first user selected position and a first measurement 802 is measured between the two hands 600a and 600b. FIG. 8B illustrates a top view of the moveable display surface 400 at a second point in time, in which the user's s hands 600a and 600b are placed on the moveable display surface 400 at a second user selected position and a second measurement 804 is measured between the two hands 600a and 600b. For example, in some embodiments of the present invention, the first measurement measures a distance between the two palms of the user when the user's 600a and 600b hands are in a normal sitting position, and the second measurement measures a distance between the two palms of the user when the user's 600a and 600b are in the farthest spread position. The first and second points it time may occur in different orders. For example, in some embodiments of the present invention, the first measurement is measured after the second measurement is measured (e.g., the second point in time may occur prior to the first point in time). In some embodiments of the present invention, the first measurement is measured prior to the second measurement is measured (e.g., the first point in time may occur prior to the second point in time).

In some embodiments of the present invention, the physical profile of a user may be updated over time in view of new hand measurements obtained. For example, as children grow fast, surface control component 502 may update the physical profile of the user at periodically for recalibration, for example, once a month for a child, once a year for an adult. Other suitable times may be utilized for updating the physical profile of the user.

Referring back to FIG. 5, the surface control component 502 is configured to generate a query, based on a received input, to search one or more databases 512 (e.g., via query component 506). In some embodiments of the present invention, the one or more datasets 512 include a plurality of objects and/or plurality of images, in which each image includes one or more objects. The received input, may be as a user input for example, in which the input is utilized by surface control component 502 to identify a particular object that is to be presented to the user via a moveable display surface (e.g., moveable display surface 400). The surface control component 502 then queries the one or more database 512 based on the generated query to obtain a search response.

In some embodiments of the present invention, the surface control component 502 is configured to analyze input audio using speech and/or dialog analyzing techniques that are able to identify an input question and return a particular object for display. Various processes exist in the art that may be used for performing speech/dialog interception. The following is a non-limiting, scenario for illustrating such a process. In the example scenario, a small child listens to her father tell a story, in which the narration and occasional dialog is monitored by surface control component 502. The moveable display surface 400 is calibrated for the child based on her generated physical profile. The father reads out loud "The Jackal jumped up toward the grape tree" and child asks, "what is a grape?" The father makes a gesture towards the moveable display surface 500, which is then passed to the surface control component 502 for processing. An input question is then identified and parsed by the surface control component 502. Surface control component 502 then infers a key response to the question, such as that the question is about returning and/or defining the meaning of a grape.

Figure 9:
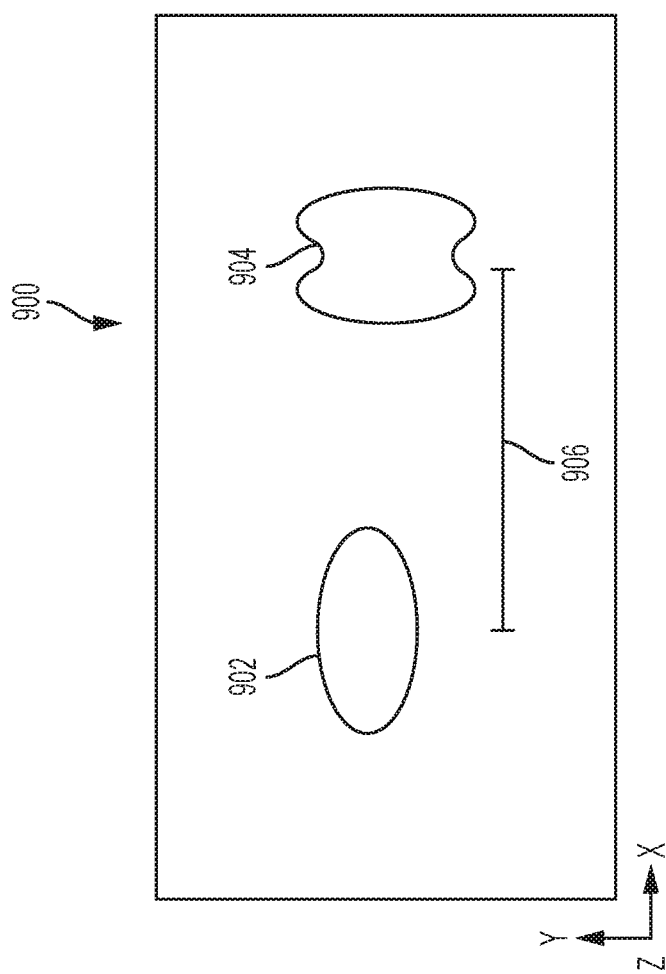
FIG. 9 depicts an example image having two objects that may be stored in a database in accordance with one or more embodiments of the present invention.

As noted above, the surface control component 502 may be configured to query one or more database 512 to obtain a search response based on the generated query, in which the database includes a plurality of objects and/or plurality of images. In some embodiments of the present invention, the search response that is obtained via the query includes one or more objects found in an image, relative positons of the objects in an image, and/or colors of the objects in an image. In some embodiments of the present invention, the search response that is obtained via the query includes at least one image of a plurality of images, the objects found in the at least one image, relative positions of the objects of the at least one image, and/or colors of the objects of the at least one image. FIG. 9 illustrates an example image 900 that may be stored in a database 512. Example image 900 depicts a scene that includes a first object 902 and a second object 904, in which the first object 902 is a football and the second object is a tomato. Element 906 denotes relative positions of the first and second objects 902 and 904. In some embodiments of the present invention, the relative positions comprise a first set of x,y coordinates associated with the first object 902, and a second set of x,y coordinates associated with the second object 904.

In some embodiments of the present invention, the one or more databases 512 includes an educational database comprising a plurality of educational images. In some embodiments of the present invention, the objects of the at least one image that are returned in the search respond includes educational objects. For example, the database may comprise a knowledge based of images that may be stored in the database or obtained from an external source (e.g., via the web). In some embodiments of the present invention, the images are stock images. Thus, in the example scenario mentioned above, surface control component 502 would then find the best image of grapes after that the input question references grapes.

Other suitable inputs may be utilized in the context of the present disclosure. For example, in some embodiments of the present invention, a digital device, such as a mobile phone, tablet, or laptop may be used to gage the interest of the user with regard to particular objects that are shown on a moveable display screen 400, and then surface control component 502 may utilize the detected interest for query generation. In some embodiments of the present invention, an eye gaze of the reader/viewer is detected for use in query formation, in which the eye gaze is determined by an eye tracker, in which the eye tracker passed parameters are passed to the then surface control component 502 (e.g., via query component 506). Surface control component 502 then utilizes the information received from the eye tracker to detect and rank the objects of the display objects based on how long the user gazed at each object, in which a high ranking is indicative of an important object that may be returned by the query.

In some embodiments of the present invention, the generation of the query is triggered when surface control component 502 receives an explicit or implicit instruction. One example of an explicit instruction includes an instruction that is sent from a user in which the user requests that a query be generated. One example of an implicit instruction is surface control component 502 inferring that the user may be helped by performing a physical interaction with an object that can be rendered by the moveable display surface 400. This may be achieved by, for example, utilizing an algorithm that performs automatic augmentation based on context.

In some embodiments of the present invention, the surface control component 502 is configured to deliver physicality to the user by transmitting a control signal to the moveable display surface that causes the grid of the moveable display surface to render the objects of the at least one image based at least in part on the physical profile and the relative positions.

In some embodiments of the present invention, prior to transmitting a control signal to the moveable display surface to cause the grid to render the objects, surface control component 502 performs a mapping operation, such as a 2D-to-3D mapping, for each object of the at least one image that is obtained via the search response (e.g., via mapping component 508) and then assigns a shape, size, depth, and a position to each object of the at least one image, based at least in part, on the physical profile and the relative depth map (e.g., via determination component 510). In some embodiments of the present invention, the mapping is based on the relative positions of the objects that obtained via the search response. In some embodiments of the present invention, the mapping includes computing a relative depth of different portions of the at least one image and creating a relative depth map from the computed relative depths. In some embodiments of the present invention, after surface control component 502 performs the mapping and assigning operations, surface control component 502 transmits the control signal that causes the grid of the moveable display surface to render the objects of the at least one image, in which the rendering is based at least in part on the assigned shapes, sizes, depths and positions.

Thus in the context of FIG. 4, in some embodiments of the present invention, the control signal may be transmitted by surface control component 502 to control circuit 407 to initiate a rending of objects. In some embodiments of the present invention, for each object to be rendered, surface control component 502 utilizes an overlap of the number of the objects returned and the profile of the child, and (c) following any rendering constraint policy provided, in which each object is assigned a shape (texture), size, set of contours and position on the moveably display surface 400. In some embodiments of the present invention, the position assigned to an object includes relative positions of the objects for instances where multiple objects are to be rendered. In some embodiments of the present invention, upon receipt of the control signal, control circuit 407 causes an object to be created on the moveable display surface 400 by dynamically rearranging cells of the plurality of cells 404 in accordance with their assigned size, shape (texture), and position parameters.

Figure 10A:
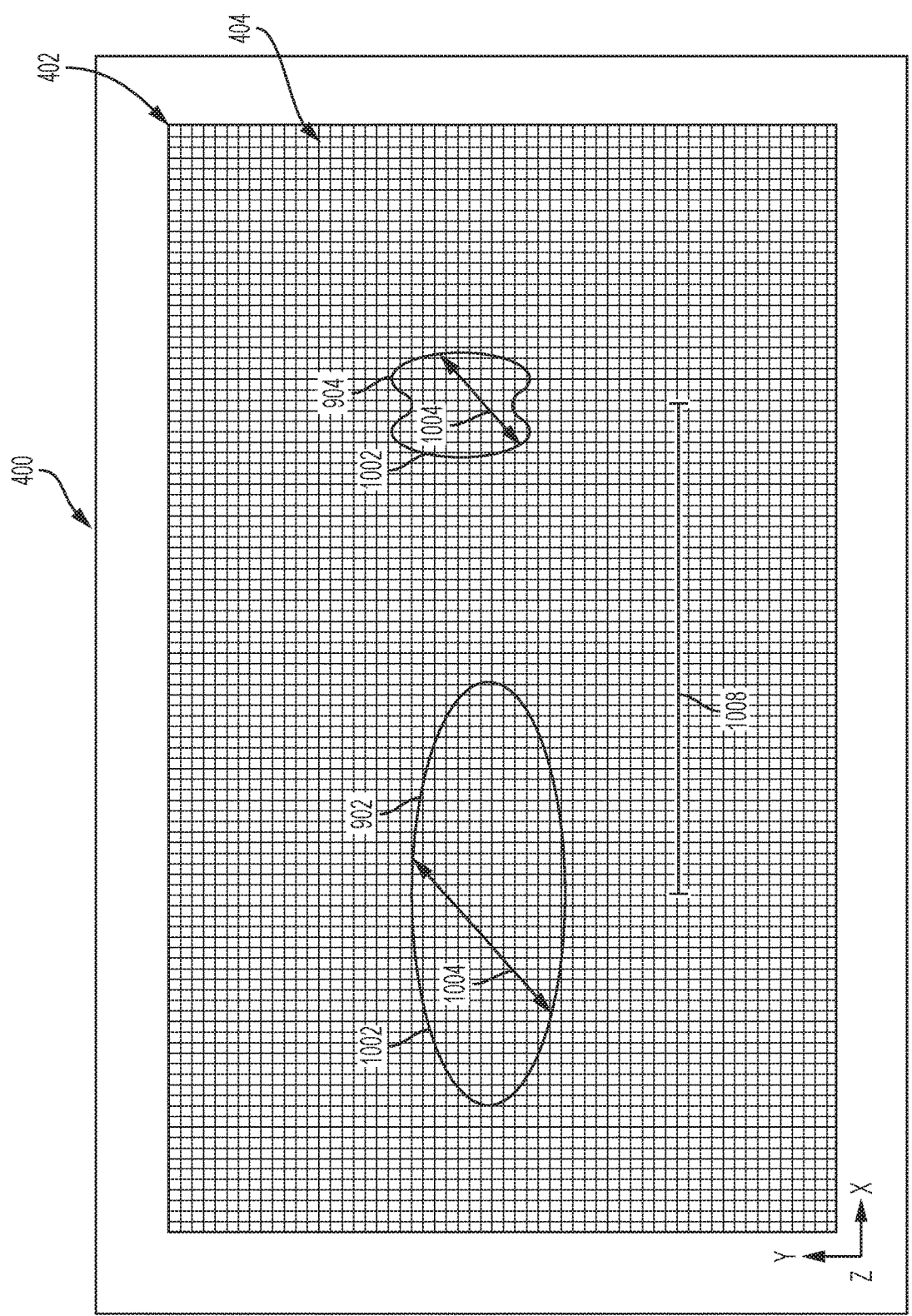
FIG. 10A depicts a top view of a moveable display surface, in which the two objects of the image of FIG. 9 are rendered on the moveable display surface in accordance with one or more embodiments of the present invention.
Figure 10B:
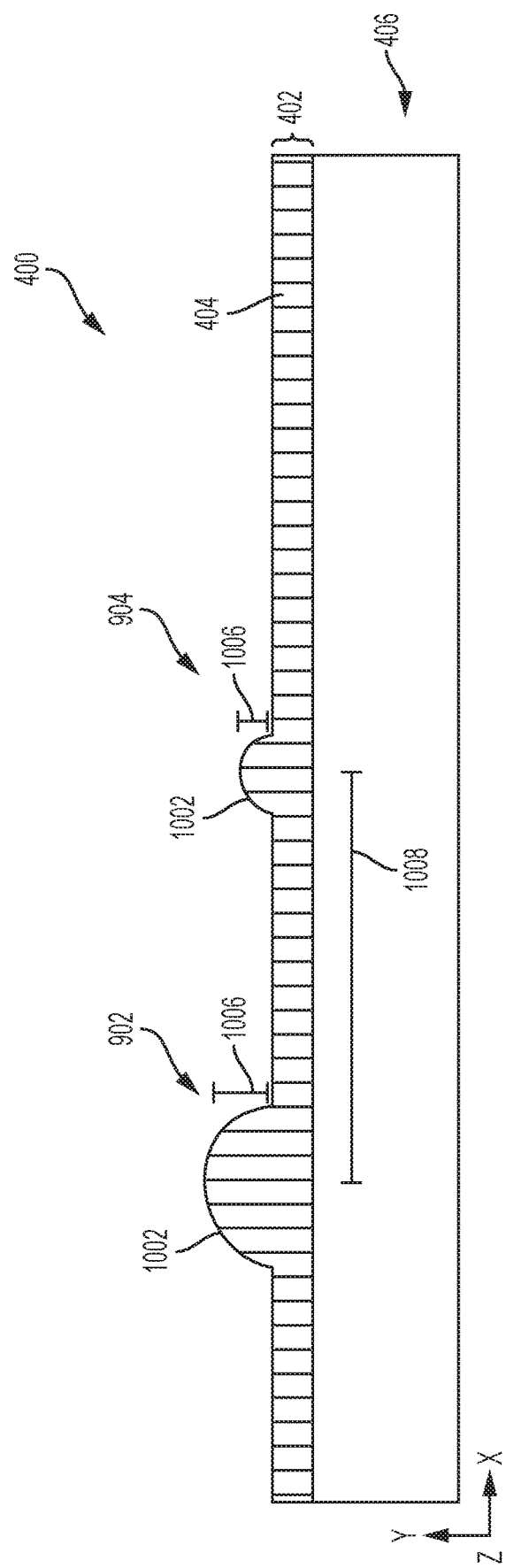
FIG. 10B depicts a side view of the moveable display surface of FIG. 10A in accordance with one or more embodiments of the present invention.

FIGS. 10A-B illustrate an example rendering of the first and second objects 902 and 904 of FIG. 9. In particular, FIG. 10A shows a top view, and FIG. 10B a side view, of a moveable display surface 400 in which the first object 902 and the second object 904 are rendered based on assigned shapes 1002, assigned sizes 1004, assigned depths 1006, and assigned positions 1008. In some embodiments of the present invention, the assigned depths 1006 include a first set of assigned contours for the first object 902 and a second set of assigned contours for the second object 904.

In some embodiments of the present invention, the size that is assigned to at least one object is less than or equal to the size of the palm of the user. In some embodiments of the present invention, the depth assigned to at least one object is less than or equal to the maximum estimated depth of the palm of the user. In certain embodiments of the present invention, in which a first and second measurements are taken between two palms of the user such as first measurement 802 and second measurement 804 shown in FIGS. 8A-B, the size assigned to at least one object is (a) less than or equal to the second measurement and (b) greater than or equal to the first measurement in one or more embodiments of the present invention. The following a non-limiting example scenario illustrating a process of rendering object of a scene. In this example scenario, a scenery is to be provided to a child, in which the scene includes an image of a dog that is walking along a road towards a house. A dog of the size of the child's palm is created to be presented on the moveable display surface 400 such that the child can reverse her palm upside-down and encompass the dog with her palm. A house in proportion to the size of the dog is created to be presented on the moveable display surface 400, in which the size of the house is bigger than the size of the child's palm as proportionality the size of the house is much larger than the size of the dog. The road is presented nearly flat on the moveable display surface 400. The road, dog, and house are placed in appropriate relative potions on the moveable display surface in accordance with their assigned dimensions, and thus are delivered on the moveable display surface 400 in a semi-physical mode.

In some embodiments of the present invention, surface control component 502 (e.g., determination component 510) is further configured to transmit a control signal that causes the grid of the moveable display surface to apply a color transformation to at least one rendered object by illuminating a subset of the plurality of moveable cells of the grid to match at least one color of colors of the obtained search response. For example, in some embodiments of the present invention, the illumination includes illuminating grid cells such that physically delivered color content is able to match the observed color content of the objects returned via the search response. In some embodiments of the present invention, the illumination is performed via backlighting. In some embodiments of the present invention, the illumination is rendered by an illumination device, such as a laser, LED, and or other suitable lighting mechanism that is capable of illuminating gird cells.

Figure 11:
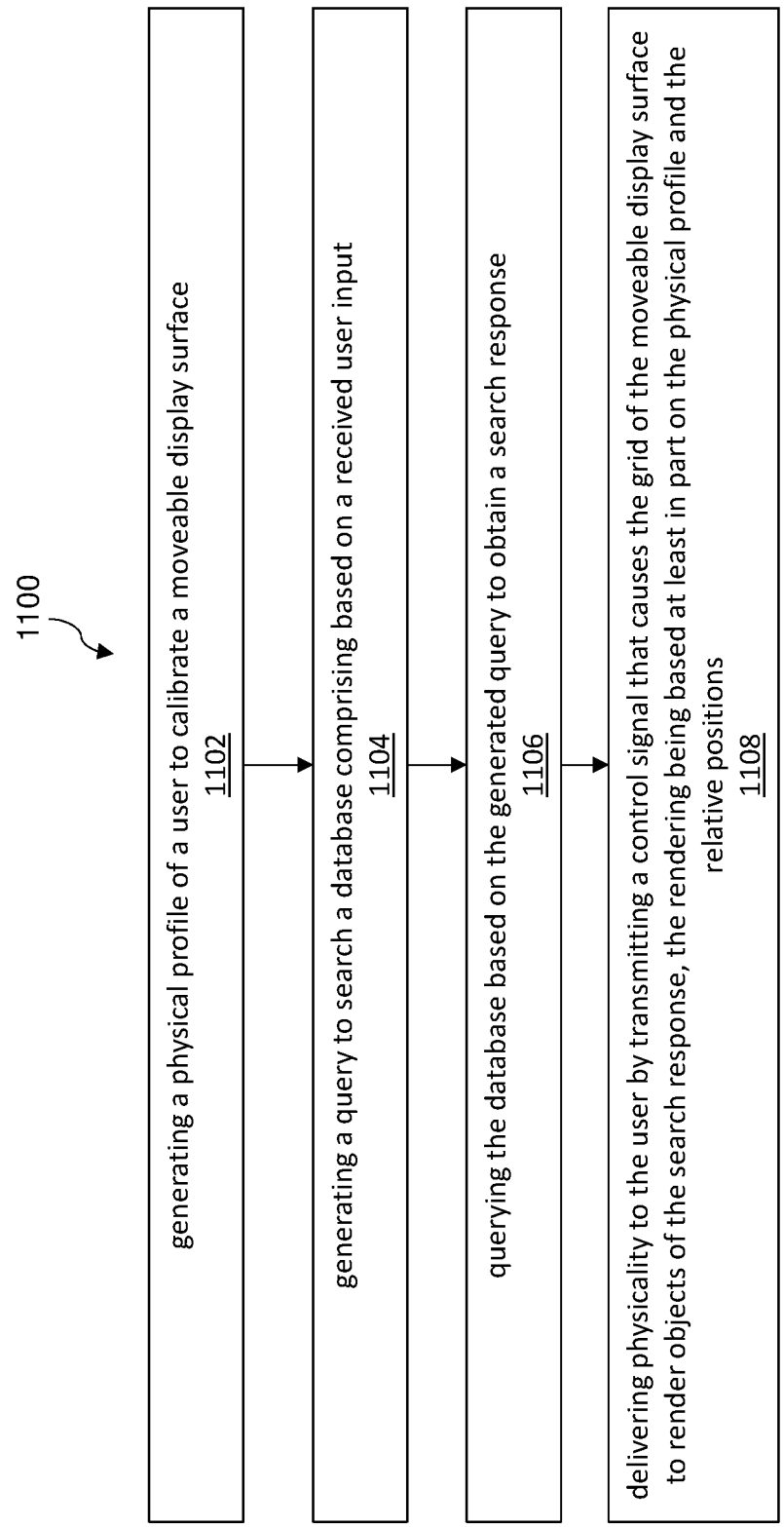
FIG. 11 is a flow diagram illustrating a methodology in accordance with one or more embodiments of the present invention.

Additional details of the operation of system 500 will now be described with reference to FIG. 11, in which FIG. 11 depicts a flow diagram illustrating a methodology 1100 according to one or more embodiments of the present invention. At 1102, a physical profile is generated for a user to calibrate a moveable display surface (e.g., via calibration component 504). At 1104, a query is generated to search a database comprising a plurality of objects and/or a plurality of images, in which the query is based on a received user input (e.g., via query component 506). At 1106, the database is queried based on the generated query to obtain a search response image (e.g., via query component 506). In some embodiments of the present invention, the search response includes an image, the objects of the image, relative positions of the objects of the image, and/or colors of the objects of the image (e.g., via query component 506). In some embodiments of the present invention, the search response includes objects, relative positions of the objects, and/or colors of the objects (e.g., via query component 506). At 1108, physicality is delivered to the user by transmitting a control signal to the moveable display surface that causes the grid of the moveable display surface to render objects of search response, the rendering being based at least in part on the physical profile and the relative positions (e.g., via mapping component 508 and determination component 510).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for dynamically reforming a moveable display surface to deliver physicality to a user, wherein the moveable display surface includes a grid comprising a plurality of moveable cells, the method comprising:
   generating a physical profile of the user to calibrate the moveable display surface, wherein the generating of the physical profile includes receiving at least one measurement of at least one hand of the user and estimating a maximum depth of a palm of the at least one hand when folded, wherein estimating the maximum depth of the palm when folded includes transmitting a control signal to the moveable display surface that causes a subset of cells of the plurality of moveable cells of the grid to increase in height until each cell of the subset of cells touches the folded palm of the user;
   receiving at least one image of a plurality of images, objects of the at least one image, and relative positions of objects of the at least one image; and
   delivering physicality to the user by transmitting a control signal to the moveable display surface that causes the grid of the moveable display surface to render the objects of the at least one image based at least in part on the physical profile and the relative positions of the objects of the at least one image.

2. The computer-implemented method of claim 1 further comprising:
   performing a 2D-to-3D mapping for each object of the at least one image based on the relative positions of the objects, wherein the 2D-to-3D mapping includes computing a relative depth of different portions of the at least one image and creating a relative depth map from the computed relative depths; and
   assigning a shape, size, depth, and a position to each object of the at least one image based at least in part on the physical profile and the relative depth map, wherein the rendering of the objects of the at least one image is based at least in part on the assigned shapes, sizes, depths and positions.

3. The computer-implemented method of claim 2, wherein the at least one measurement of at least one hand of the user comprises a size of a palm of the user, wherein the size assigned to at least one object is less than or equal to the size of the palm of the user.

4. The computer-implemented method of claim 2, wherein the depth assigned to at least one object is less than or equal to the estimated maximum depth of the palm of the user.

5. The computer-implemented method of claim 1, wherein the at least one measurement of at least one hand of the user comprises at least one shape of a palm of the user, size of a palm of the user, size of the at least one hand of the user, or shape of the at least one hand of the user.

6. The computer-implemented method of claim 2, wherein the at least one measurement of at least one hand of the user further comprises a first and second measurement between two palms of the user, wherein the first measurement comprises a distance measured between two hands of the user when the two hands are placed on the moveable display surface at a first user-selected position, wherein the second measurement comprises a distance measured between the two hands of the user when the two hands are placed on the moveable display surface at a second user-selected position, wherein the size assigned to at least one object is (a) less than or equal to the second measurement and (b) greater than or equal to the first measurement.

7. The computer implemented method of claim 1 further comprising transmitting a control signal that causes the grid of the moveable display surface to apply a color transformation to at least one rendered object by illuminating a subset of the plurality of moveable cells of the grid to match at least one predetermined color.

8. The computer implemented method of claim 1, wherein delivering physicality to the user includes delivering educational content to the user via the rendering of the objects on the grid of the moveable display surface, wherein the objects of the at least one image are educational objects.

9. A system for dynamically reforming a moveable display surface to deliver physicality to a user, wherein the moveable display surface includes a grid comprising a plurality of moveable cells, the system comprising one or more processors configured to perform a method comprising:
  generating, by the system, a physical profile of the user to calibrate the moveable display surface, wherein the generating of the physical profile includes receiving at least one measurement of at least one hand of the user and estimating a maximum depth of a palm of the at least one hand when folded, wherein estimating the maximum depth of the palm when folded includes transmitting a control signal to the moveable display surface that causes a subset of cells of the plurality of moveable cells of the grid to increase in height until each cell of the subset of cells touches the folded palm of the user;
  receiving at least one image of a plurality of images, objects of the at least one image, and relative positions of objects of the at least one image; and
  delivering physicality to the user by transmitting a control signal to the moveable display surface that causes the grid of the moveable display surface to render the objects of the at least one image based at least in part on the physical profile and the relative positions of the objects of the at least one image.

10. The system of claim 9, wherein the method further includes:
  performing a 2D-to-3D mapping for each object of the at least one image based on the relative positions of the objects, wherein the 2D-to-3D mapping includes computing a relative depth of different portions of the at least one image and creating a relative depth map from the computed relative depths; and
  assigning a shape, size, depth and a position to each object of the at least one image based at least in part on the physical profile and the relative depth map, wherein the rendering of the objects of the at least one image is based at least in part on the assigned shapes, sizes, depths and positions.

11. The system of claim 10, wherein the at least one measurement of at least one hand of the user comprises a size of a palm of the user, wherein the size assigned to at least one object is less than or equal to the size of the palm of the user.

12. The system of claim 10, wherein the depth assigned to at least one object is less than or equal to the estimated maximum depth of the palm of the user.

13. The system of claim 9, wherein the method further includes transmitting a control signal that causes the grid of the moveable display surface to apply a color transformation to at least one rendered object by illuminating a subset of the plurality of moveable cells of the grid to match at least one predetermined color.

14. The system of claim 9, wherein delivering physicality to the user includes delivering educational content to the user via the rendering of the objects on the grid of the moveable display surface, wherein the objects of the at least one image are educational objects.

15. A computer program product for dynamically reforming a moveable display surface to deliver physicality to a user, wherein the moveable display surface includes a grid comprising a plurality of moveable cells, the computer program product comprising a computer readable storage medium having program instructions embodied therewith, the program instructions executable by a system comprising one or more processors to cause the system to perform a method comprising:
  generating, by the system, a physical profile of the user to calibrate the moveable display surface, wherein the generating of the physical profile includes receiving at least one measurement of at least one hand of the user and estimating a maximum depth of a palm of the at least one hand when folded, wherein estimating the maximum depth of the palm when folded includes transmitting a control signal to the moveable display surface that causes a subset of cells of the plurality of moveable cells of the grid to increase in height until each cell of the subset of cells touches the folded palm of the user;
  receiving at least one image of a plurality of images, objects of the at least one image, and relative positions of objects of the at least one image; and
  delivering physicality to the user by transmitting a control signal to the moveable display surface that causes the grid of the moveable display surface to render the objects of the at least one image based at least in part on the physical profile and the relative positions of the objects of the at least one image.

16. The computer program product of claim 15, wherein the method further includes:
  performing a 2D-to-3D mapping for each object of the at least one image based on the relative positions of the objects, wherein the 2D-to-3D mapping includes computing a relative depth of different portions of the at least one image and creating a relative depth map from the computed relative depths; and
  assigning a shape, size, depth and a position to each object of the at least one image based at least in part on the physical profile and the relative depth map, wherein the rendering of the objects of the at least one image is based at least in part on the assigned shapes, sizes, depths and positions.

17. The computer program product of claim 16, wherein the at least one measurement of at least one hand of the user comprises a size of a palm of the user, wherein the size assigned to at least one object is less than or equal to the size of the palm of the user.

18. The computer program product of claim 16, wherein the depth assigned to at least one object is less than or equal to the estimated maximum depth of the palm of the user.

19. The computer program product of claim 15, wherein the method further includes transmitting a control signal that causes the grid of the moveable display surface to apply a color transformation to at least one rendered object by illuminating a subset of the plurality of moveable cells of the grid to match at least one predetermined color.

20. The computer program product of claim 15, wherein delivering physicality to the user includes delivering educational content to the user via the rendering of the objects on the grid of the moveable display surface, wherein the objects of the at least one image are educational objects.

* * * * *